United States Patent
Han et al.

(10) Patent No.: US 12,052,794 B2
(45) Date of Patent: Jul. 30, 2024

(54) SYSTEMS AND METHODS FOR WIRELESS CAMERA DETECTION

(71) Applicant: HEWLETT PACKARD ENTERPRISE DEVELOPMENT LP, Houston, TX (US)

(72) Inventors: Jianpo Han, Beijing (CN); Liao Xu, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 531 days.

(21) Appl. No.: 16/905,861

(22) Filed: Jun. 18, 2020

(65) Prior Publication Data
US 2021/0400460 A1    Dec. 23, 2021

(51) Int. Cl.
*H04W 8/00*     (2009.01)
*H04L 43/0888*  (2022.01)
*H04W 24/08*    (2009.01)

(52) U.S. Cl.
CPC ......... *H04W 8/005* (2013.01); *H04L 43/0888* (2013.01); *H04W 24/08* (2013.01)

(58) Field of Classification Search
CPC ............ H04W 8/005; H04W 24/00–10; H04L 43/00–50
See application file for complete search history.

(56) References Cited

U.S. PATENT DOCUMENTS

| | | | |
|---|---|---|---|
| 2013/0147962 A1* | 6/2013 | Siann | H04L 67/12 348/159 |
| 2013/0250120 A1* | 9/2013 | Ooi | H04N 7/181 348/159 |
| 2014/0157442 A1* | 6/2014 | Elson | G01V 8/12 726/32 |
| 2021/0044485 A1* | 2/2021 | Yeom | H04L 67/143 |
| 2021/0109971 A1* | 4/2021 | Zhong | G06N 3/08 |

FOREIGN PATENT DOCUMENTS

| | | |
|---|---|---|
| KR | 20-0329397 | 10/2003 |
| WO | 2008/069486 A1 | 6/2008 |

OTHER PUBLICATIONS

Yushi Cheng et al., DeWiCam: Detecting Hidden Wireless Cameras via Smartphones, Jun. 2018, ASIA CCS', pp. 1-13 (Year: 2018).*

(Continued)

*Primary Examiner* — Michael Thier
*Assistant Examiner* — Prince A Mensah
(74) *Attorney, Agent, or Firm* — Sheppard Mullin Richter & Hampton LLP

(57) ABSTRACT

Systems and methods are provided for detecting the presence of a hidden camera on a network. When video is encoded and transmitted over/across a network, the data packet carrying the video tend to exhibit certain characteristics or features specific to video traffic from a hidden camera. A machine learning model for detecting the presence of a hidden camera can be trained based on these characteristics and features. Once trained, the machine learning model can be operationalized on an access point that can analyze real-time network traffic to determine whether a hidden camera(s) is operating on the network.

20 Claims, 12 Drawing Sheets

(56) References Cited

OTHER PUBLICATIONS

Tian Liu et al., Detecting Wireless Spy Cameras Via Stimulating and Probing, Jun. 2018, Association for Computing Machinery (ACM), pp. 1-13 (Year: 2018).*
Cheng et al., "DeWiCam: Detecting Hidden Wireless Cameras via Smartphones", ASIACCS'18, ACM, Jun. 4-8, 2018, pp. 1-13.
Google Play, "Detectify—Detect Hidden Devices", available online at <https://play.google.com/store/apps/details?id=com.wondertechstudio.hiddendevicedetectorandcameradetector&hl-en>, Retrieved on Jun. 22, 2020, 3 pages.
Liu et al., "DetectingWireless Spy Cameras Via Stimulating and Probing", MobiSys '18, ACM, Jun. 10-15, 2018, 13 pages.
Wikipedia, "Video compression picture types", available online at <https://en.wikipedia.org/w/index.php?title=Video_compression_picture_types&oldid=916270429>, Sep. 18, 2019, 4 pages.

* cited by examiner

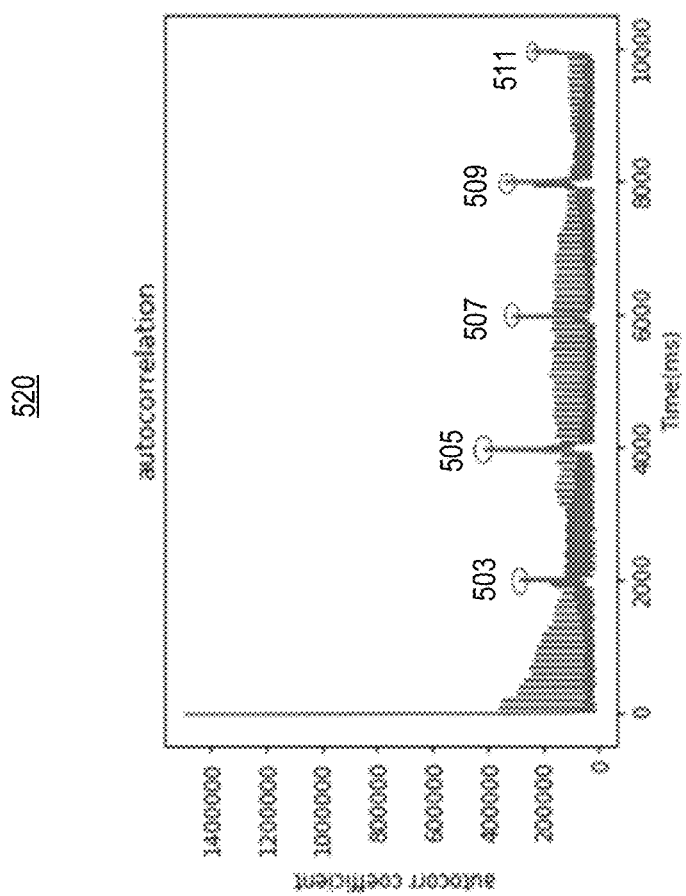
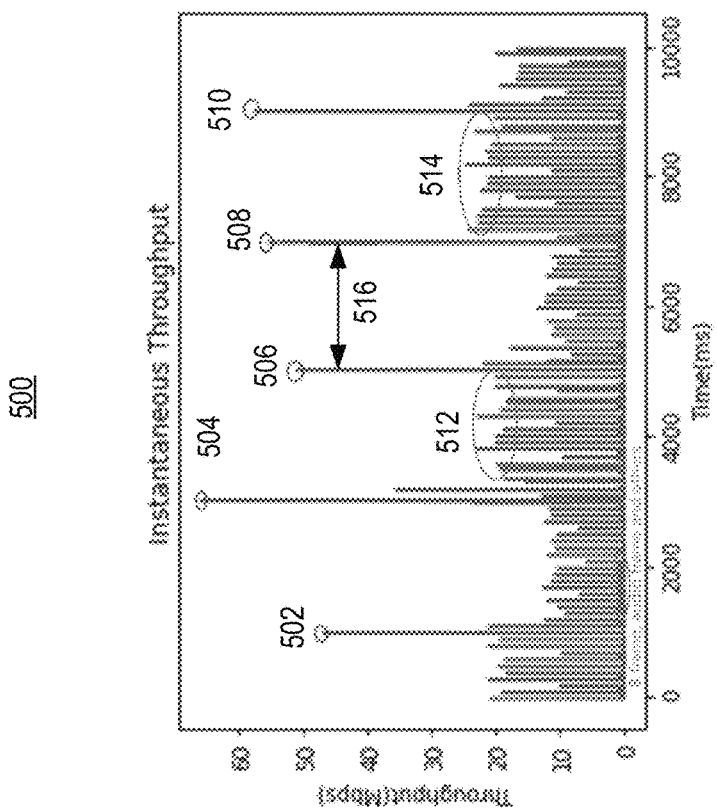
FIG. 5B
FIG. 5A

SYSTEMS AND METHODS FOR WIRELESS CAMERA DETECTION

DESCRIPTION OF RELATED ART

Cameras, such as video and/or still cameras, motion activated cameras, night vision cameras, etc. are often used in security applications. Cameras used in security applications allow a user to install such cameras at a remote location, and, e.g., review footage captured by the camera from a safe or more convenient location, or when the user cannot be at the area/space where the camera happens to be installed.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 5A is an example graphical representation of raw data packet traffic throughput.

FIG. 5B is an example graphical representation of the raw data packet traffic of FIG. 5A after application of an auto-correlation function.

Figure 1A:
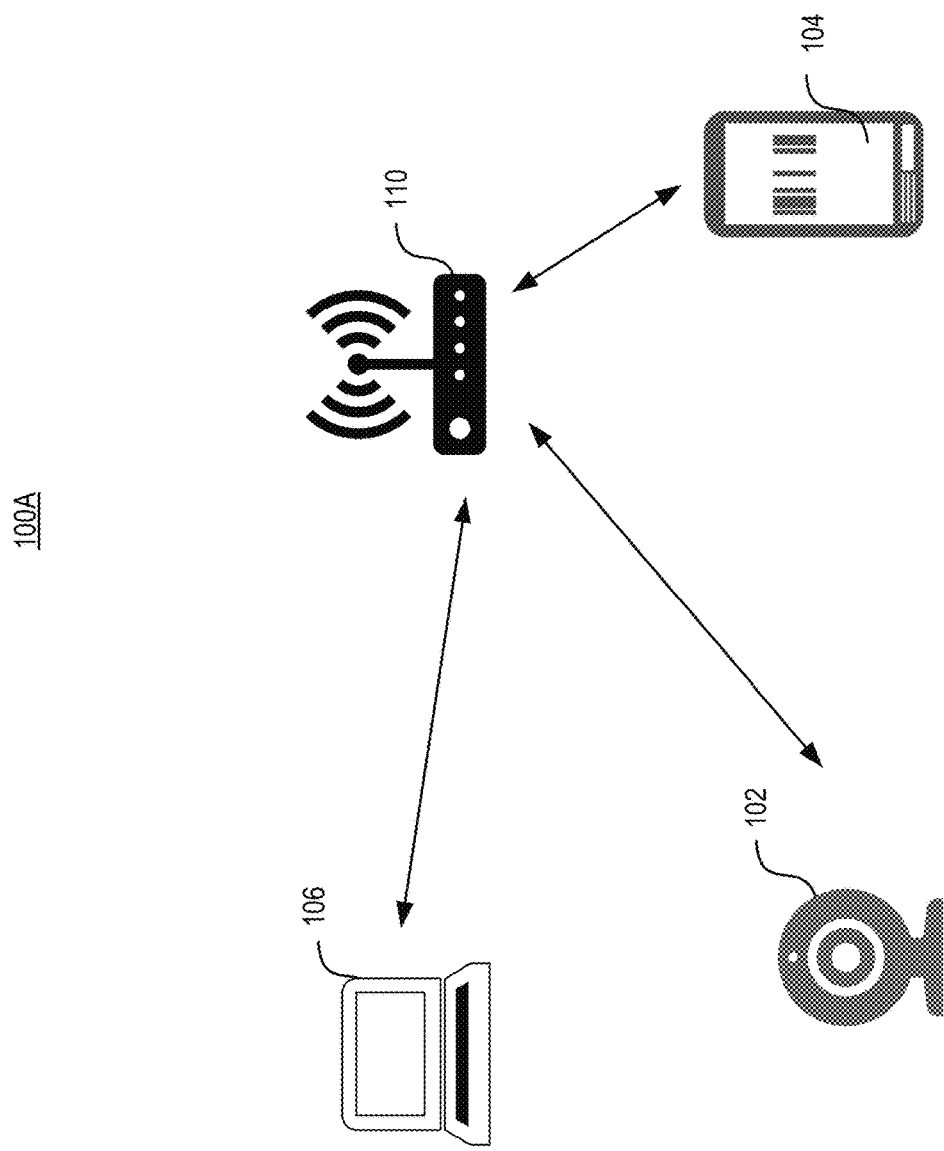
FIG. 1A illustrates an example system in which various wireless devices may be operating including a hidden camera.

The figures are not exhaustive and do not limit the present disclosure to the precise form disclosed.

DETAILED DESCRIPTION

As noted above, cameras can be used for security purposes, e.g., to remotely monitor a particular area/space such a warehouse, one's home while unoccupied, and so on. Some cameras may have a large enough footprint that they are installed in plain view. Other cameras may have a smaller footprint or are designed for the purpose of being hidden from plain view, e.g., pinhole cameras, and can be hidden in furniture, decorative room elements, dummy electrical outlets, vents, etc. Due to the nature of use, these hidden cameras tend to be digital wireless video cameras, also referred to as wireless surveillance cameras. Because hidden cameras tend to be relatively small, there is not much room, if any, for on-board memory on which to store captured video. Digital wireless cameras allow users to leverage broadband wireless internet connectivity to provide video streaming, and can transmit analog video signals encoded as digital packets over, e.g., high-bandwidth radio frequencies, to remote storage, to a remote viewing device for viewing as a video stream, etc. For example, even if a camera may support the use of memory cards (e.g., SD cards), hidden cameras used for spying typically cannot be accessed easily/at will (due the nature of their use/installation). Moreover, while some cameras may have, e.g., a cellular modem, such modems are larger in size, incur service provider fees, and may require the use of a SIM card that can be used to identify a user. Thus, the use of a cellular modem would likely be forgone in favor of WiFi connectivity to transfer video captured by a hidden camera.

However, hidden cameras also lend themselves to being used for more nefarious purposes, e.g., unsanctioned spying. For example, hidden cameras have been installed in electrical outlets, usb chargers, clocks, etc., and used to spy on hotel guests. Thus, there is a need for detecting the existence of such hidden cameras in order to prevent or thwart their unauthorized use.

Accordingly, various embodiments leverage wireless video transfer/compression characteristics to detect the presence/use of such hidden cameras. In one embodiment, a camera detection model can be trained using data comprising captured video data packets from pinhole (or other types of hidden/digital wireless) cameras. These data packets may reflect particular uplink/downlink throughput, burst rate, etc. that are indicative of captured video being wirelessly transmitted from a hidden camera to a remote server, datastore, or other device. In particular, a machine learning model (such as a decision tree model) can be generated and trained using video data packets, the characteristics of which can be used to identify video being transmitted from hidden cameras by analyzing data packet streams.

For example, data packet traffic from such hidden cameras tends to result in spikes or peaks that correspond to certain fragments or segments of captured video. Depending on the video quality and video coding/compression being used, these spikes or peaks tend to occur at regular intervals, and can be distinguished from conventional video transmission, e.g., streaming video, video meetings, etc. Thus, when a data packet stream is analyzed, and the traffic characteristics match or correspond to some periodicity of traffic known to embody or reflect the transmission of captured video from a hidden camera, it can be assumed that the data packets are carrying captured video from a hidden camera.

Because hidden cameras wirelessly transmit captured video, the captured video often traverses one or more wireless network elements, such as access points APs. By monitoring data packet traffic that passes through access points, the existence of hidden cameras can be detected. That is, the data packet traffic passing through an access point can be analyzed. If the data packet traffic is found to exhibit the same/similar features, characteristics, or qualities of data packets known to be associated with wireless video transmission from a hidden camera, it can be assumed that a hidden camera is being used within the operational vicinity of the access point. Data packets may comprise, at least in part, a data packet header, e.g., Internet Protocol (IP) header. Header information may include source address, destination address, port information, etc. Accordingly, an access point is aware of a particular source associated with the data packets it monitors.

It should be noted that traffic periodicity is not the only "defining" feature of video transmissions from a hidden camera. Other features or characteristics that can suggest the transmission of captured video from a hidden camera can include uplink throughput, the number of data packet flows and/or the life cycle of such data packet flows, and packet size distribution. Still other features or characteristics that can be used to predict the existence of hidden cameras include, for example, non-traffic features. For example, if operating system fingerprints can be discerned from data packets, a determination can be made as to whether or not the data is originating from a hidden camera or other device. That is, hidden cameras tend to use embedded systems rather than Windows or MacOS. If data packets are associated with Windows or MacOS operating systems, an assumption can be made that such data packets are not carrying video from a hidden camera. Additionally still, due to the nature of hidden camera installations, hidden cameras tend to be stationary (e.g., in the case of an electrical outlet installation) or at least move very little (in the case of a clock installation). Thus, movement (or lack of movement), can be a factor used to determine the existence or non-existence of a hidden camera.

Once trained, the aforementioned model can be operationalized or implemented within an access point. In this way, the model can be used to analyze data packet traffic passing through the wireless access point to determine if the data packet traffic suggests the existence of a hidden camera. In other embodiments, a third party access point can be sniffed, and wireless data packets exchanged with the third party access point can be analyzed to determine the presence or use of a hidden camera based on one or more of the above-mentioned indicators, e.g., data packet traffic and non-traffic related features, characteristics, etc.

FIG. 1A illustrates an example system or network 100A in which various wireless or mobile devices may be operating. In this example, system 100A may include a hidden camera 102, a smartphone 104, and a laptop computer 106. Each of these devices may use access point 110 to communicate data packets wirelessly to a target device (not shown). In this example, because data packets from hidden camera 102, smartphone 104, and laptop computer 106 pass through access point 110, access point 110 can be used to analyze the data packet traffic it receives to detect that at least some portion of the data packet traffic is originating from a hidden camera, i.e., hidden camera 102. As noted above, the analysis of data packet traffic can be performed using a trained machine learning model implemented on access point 110. As noted above, and as will be described in greater detail below, upon detecting certain characteristics of the data packet traffic (or other indicators/differentiators), a determination as to whether or not video from a hidden camera is being transmitted to an access point can be made. For example, data packet traffic from hidden camera 102 can be differentiated from data packet traffic either of smartphone 104 or laptop computer 106.

Figure 1B:
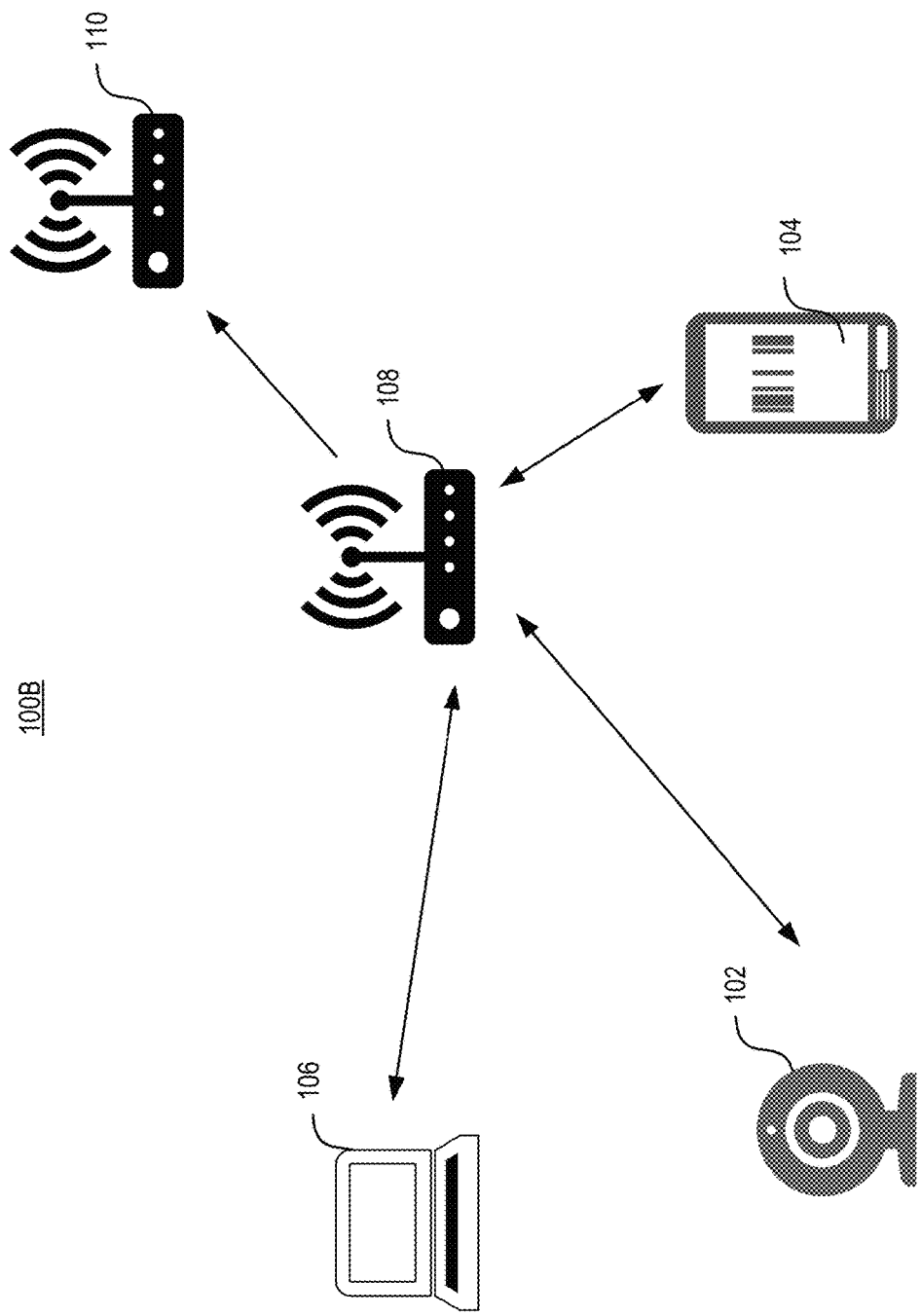
FIG. 1B illustrates another example system in which various wireless devices may be operating including a hidden camera

FIG. 1B illustrates an example system or network 100B in which various wireless or mobile devices may be operating, similar to example system 100A. As illustrated in FIG. 1B, system 100B may also include hidden camera 102, smartphone 104, and laptop computer 106. However, in system 100B, at least hidden camera 102 may use access point 108 to communicate data packets wirelessly to a target device (not shown). Because data packets from at least hidden camera 102 pass through access point 108, access point 110, which may have the trained hidden camera detection model, cannot be used to directly analyze the data packet traffic from hidden camera 102. However, access point 110 may act as a network sniffer. That is, access point 110 may capture or intercept data packets from access point 108 for analysis, in this case, for analyzing data packet/data packet traffic characteristics to determine the existence of a hidden camera, such as hidden camera 102.

As noted above, certain features or qualities of data packet traffic from wireless devices may be distinctive and thus, may be used to identify the existence of a particular device on a network. In the case of hidden cameras that can encode captured video as digital data packets, and transmit those data packets on the network through network devices, such as access points, those features or qualities can include data packet traffic characteristics, features of the data packets themselves, as well as certain non-traffic related aspects. It should be understood that when monitoring data packet traffic in a network from an access point, the access point may see many data packet streams exhibiting a variety of characteristics or features. Accordingly, in some embodiments, a plurality of data packet traffic/data packet-related characteristics may be used to determine whether data packet traffic/data packets are associated with a hidden camera.

One characteristic of data packet traffic that can be analyzed is uplink and downlink throughput. Through the study of data packet traffic originating from hidden cameras, it has been determined that hidden cameras tend to transmit data more so that receive data. This is understandable as most hidden cameras are configured for the sole purpose of capturing and transmitting captured video. Accordingly, there is little to no downlink throughput from hidden cameras (e.g., less than approximately 50 kbps), while in the uplink direction, hidden cameras can be associated with a greater throughput, which can vary between approximately 100 kbps and 2 Mbps. The variance can be the result of varying video quality/resolution at which captured video is encoded, e.g., 360p, 480p, 720p, 1080p, etc., and/or whether the video captured by a hidden camera involves movement.

Figure 2:
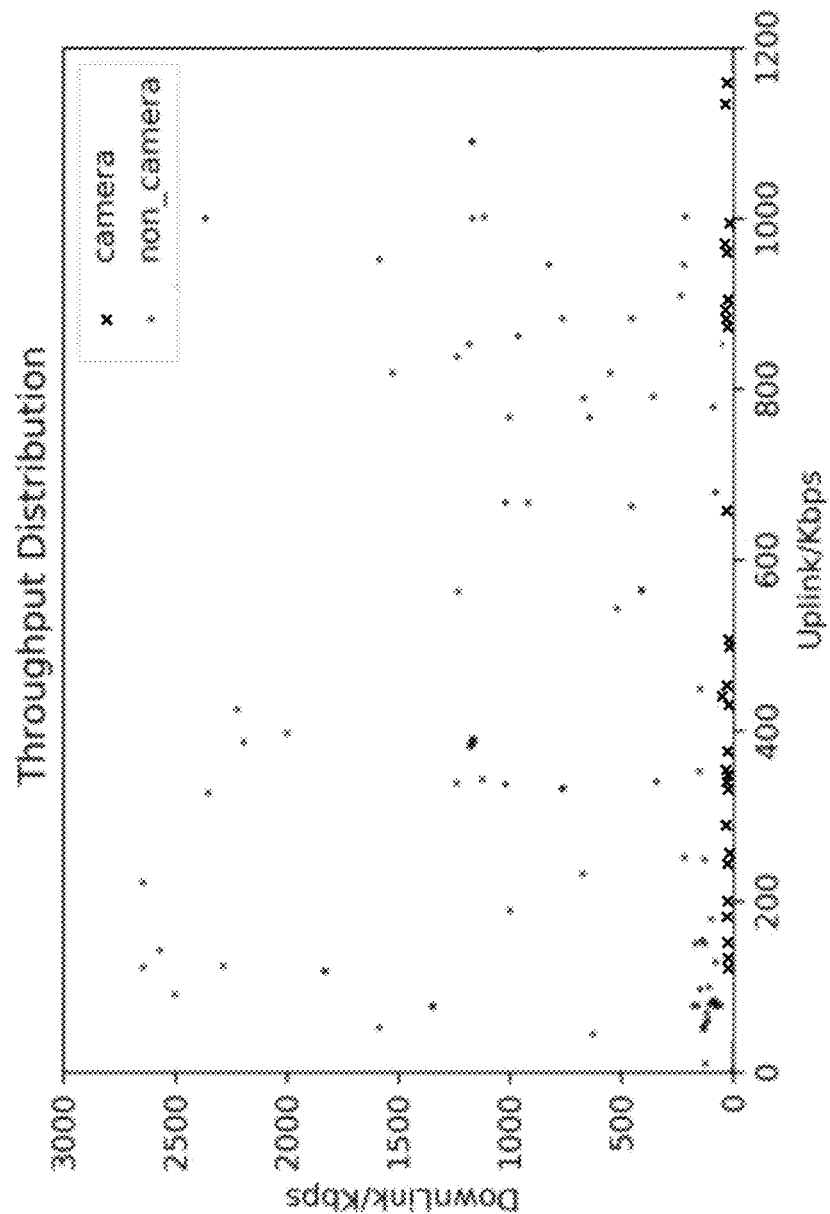
FIG. 2 is an example graphical representation of uplink and downlink data packet throughput.

FIG. 2 illustrates an example plot 200 of uplink and downlink throughput, i.e., an example throughput distribution of some sample(s) of data packet traffic that includes hidden camera data packet traffic (designated as "x"). Here, the existence of uplink data packet traffic, as well as a distribution of uplink data traffic between approximately 100 kbps and 2 Mbps may indicate the presence of a hidden camera on the network. In the example throughput distribution illustrated in FIG. 2, it can be appreciated that non-camera data packet traffic (designated as "•") appears in both the uplink and downlink directions, and without any data clustering between approximately 100 kbps and 2

Mbps. For example, if another dataset sample were to be analyzed where the throughput distribution reflected no uplink data packet traffic, it can be assumed that no hidden camera is operative on the network.

Traffic stability or throughput fluctuation can also be an indicator of hidden camera data packet traffic. As alluded to above, a hidden camera, such as hidden camera 102 (FIGS. 1A, 1B), may encode captured video into data packets. Hidden cameras typically encode video using a variable bit rate, and after encoding, the video is further compressed to save bandwidth. Three types of "pictures" or frames are commonly used in encoding video, i.e., frames or slices referred to as I, P, and B frames. An I-frame can refer to a single frame of digital content, in this case, digital video, that a compressor examines independent of the frames that precede and follow it and stores all of the data needed to display that frame. Typically, I-frames are interspersed with P-frames and B-frames in compressed video. A P-frame or predictive frame may follow I-frames, and can contain only the data that has changed from a preceding I-frame (such as color or content changes). A B-frame or bi-directional frame can refer to another type of predictive frame that contain only data that has changed from a preceding frame or data that is different from the data in the very next frame.

I-frames tend to be encoded as the largest data packets and can be fragmented across multiple data packets. This is true of both stationary and motion video. P-frames tend to be smaller in size (when encoding stationary video) relative to P-frames encoding motion video that result in larger data packets, and again, may be fragmented across multiple data packets. B-frames tend to be smaller in size (similar to P-frames of stationary video), but are generally un-fragmented. These characteristics of encoded video can be used to determine whether or not data packet traffic includes encoded video FIG. 3A illustrates an example graph 300 that reflects video resolution as a function of uplink throughput of a hidden camera using I-P-B compression techniques. The difference between video of a stationary scene and video of a scene with motion tends to be on the order of 1-3× depending on resolution. As illustrated in FIG. 3A, as resolution increases, uplink throughput of motion video increases when considering all types of frames (I, P, and B). Thus, if data traffic stability/throughput fluctuation tends to reveal 1-3× variances, it may be assumed that a hidden camera is transmitting I-P-B-encoded video.

Figure 3B:
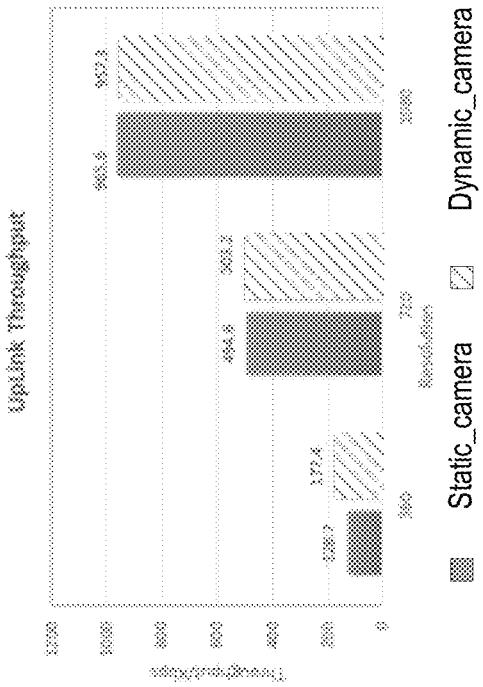
FIG. 3B is an example graphical representation of video resolution as a function of uplink throughput of a hidden camera using only I-frames.
Figure 3A:
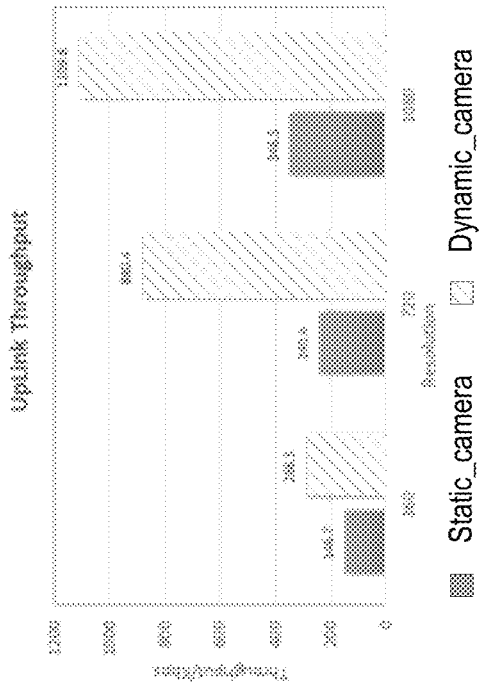
FIG. 3A is an example graphical representation of video resolution as a function of uplink throughput of a hidden camera.

FIG. 3B illustrates an example graph 302 that reflects video resolution as a function of uplink throughput of a hidden camera using only I-frames (i.e., encoding without compression). In this case, there tends not to be any appreciable difference between video of a stationary scene and video of a scene with motion. Typically, motion video throughput tends to fluctuate and tends to be greater/higher than that of static video, e.g., about three times as much, while static video throughput tends to remain constant. In some cases, when video is encoded using I-frames only, motion video data packet traffic also tends to be constant. However, if data packet traffic fluctuates too much, e.g., about five times more than static video, it can be assumed that the data packets are not hidden camera data packets holding encoded video.

The number of "flows" or connections between a first device and one or more other devices may also be indicative or help to identify the existence of a hidden camera. That is, hidden cameras tend to less host connections while other devices, such as a smartphone or laptop computer may have more connections to hosts, e.g., connections to each other, to routers, hotspots, cellular base stations, etc. The connections with which a hidden camera is associated can be greater than one because the hidden camera may be transmitting video to multiple servers/devices, and there may be certain background traffic generated by a TCP/IP stack, although video typically dominates data packet traffic when present. That is, non-hidden camera devices tend to have traffic related to online movie viewing, video meeting transmission, and other such "normal" video transmission. Accordingly, if data packet traffic is analyzed and shown to include data packets between a particular wireless device and a relatively large number of connections, it may be assumed that the wireless device is not a hidden camera. However, if data packet traffic is analyzed and shown to include data packets between a particular wireless device and only one to three connections, it may be assumed that the wireless device is a hidden camera.

Figure 4:
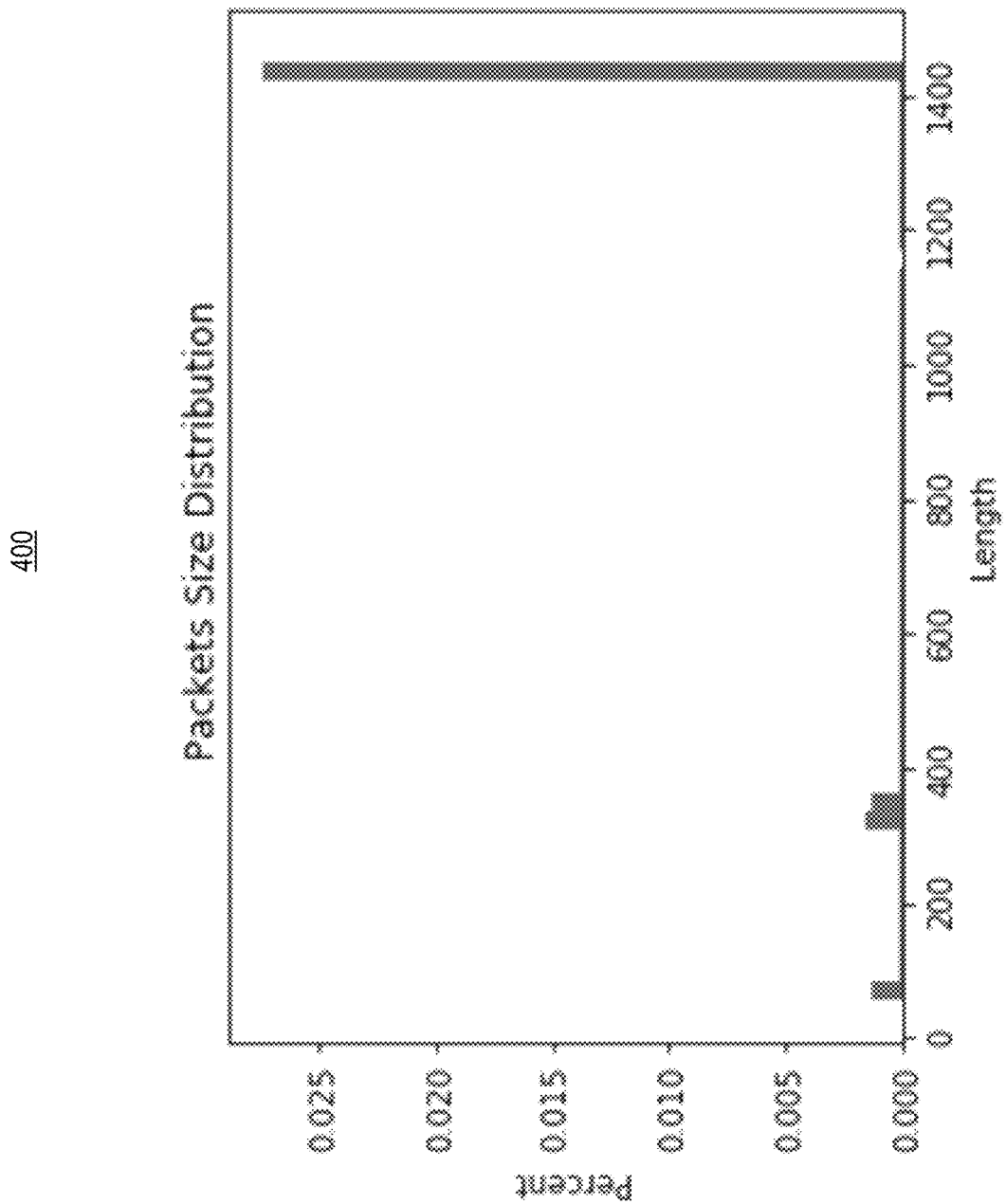
FIG. 4 is an example graphical representation of percentage data packet length distribution.

Packet size distribution may be another feature or characteristics of data packet traffic that can be indicative of a hidden camera. In most instances, the dominant packets in a video stream tend to be I-frames and P-frames, which are fragmented into slices and transmitted. Accordingly, data packet traffic carrying encoded video tends to include relatively large packets (indicating I/P-frames, and in some cases equal to the size of a maximum transmission unit of a network) followed by acknowledgement (ACK) data packets that are small relative to the I/P frame data packets. FIG. 4 illustrates an example packet size distribution graph 400 reflecting the percentage distribution of data packet length (size). It can be appreciated that the illustrated distribution of packet size observed in data packet traffic can be indicative of a hidden camera transmitting encoded video, and an AP returning an ACK. It should be understood that packet size distribution amongst hidden cameras tend to exhibit particular packet sizes/distributions, and such tendencies/patterns can be learned by a hidden camera model.

Data packet traffic periodicity is still another potential indicator of the existence of a hidden camera. That is, encoded video data packet traffic tends to have a particular periodicity reflecting I-frame and P-frame transmission. It should be noted that predicting hidden camera existence based on B-frame transmission is not accurate as B-frames tend to be small in size and have a lot of variation, making detecting trends in their transmission difficult. However, I-frame and P-frame transmission tend to occur at regular periods or intervals.

FIG. 5A illustrates an example graphical representation of "raw" data packet traffic. Throughput peaks 502, 504, 506, 508, and 510 correspond to I-frame data packet traffic. Throughput peaks 512 and 514 correspond to P-frame data packet transmission. A time frame 516 reflects the regular periodicity of I-frame data packet traffic. Although some periodicity can be detected in graph 500, there can be enough noise, e.g., B-frame traffic, audio traffic, varying I-frame/P-frame size, frame jitters, etc. that the periodicity of I/P-frame data packet traffic can be difficult to discern. Thus, the raw data packet traffic data can be run through an autocorrelation (or similar) function known to those of ordinary skill in the art currently, or in the future, to normalize the data, and make it easier to analyze the data for traffic periodicity. For example, FIG. 5B is a graph 520 that reflects the raw data packet traffic of FIG. 5A after processing through an autocorrelation function resulting in autocorrelation coefficients as a function of time (rather than raw throughput as a function of time as illustrated in FIG. 5A). It can be appreciated that the traffic periodicity associated with the transmission of I-frame encoded video is relatively easy to identify. In this example, the autocorrelation coefficients peak at, e.g., 2000 ms, 4000 ms, 6000 ms, and so on. Thus, the peak interval is approximately 2000 ms, which corresponds to/is the same as I-frame transmission interval for typical hidden cameras capturing static video scenes.

It should be noted that in some embodiments, standard autocorrelation functions may calculate correlation among all time serial samples of a data set, the given complexity being reflected by the function, $o(N^2)$, where N corresponds to the number of data packets during a specified time window. Thus, in some embodiments, an autocorrelation function utilized herein by calculate correlation at certain time points, e.g., in a burst interval, such that complexity can be lowered to $o(N)$. For example, the top two burst intervals t1 and t2 may be determined, and an autocorrelation function can be applied at time, t0, t1, t2, t1+t2, 2*t1, 2*t2, 3*t1, 3*t2, 3*(t1+t2), and so on. A search for peak values at the specified time intervals, and if peak intervals are consistent, that peak interval can be returned.

Figure 6B:
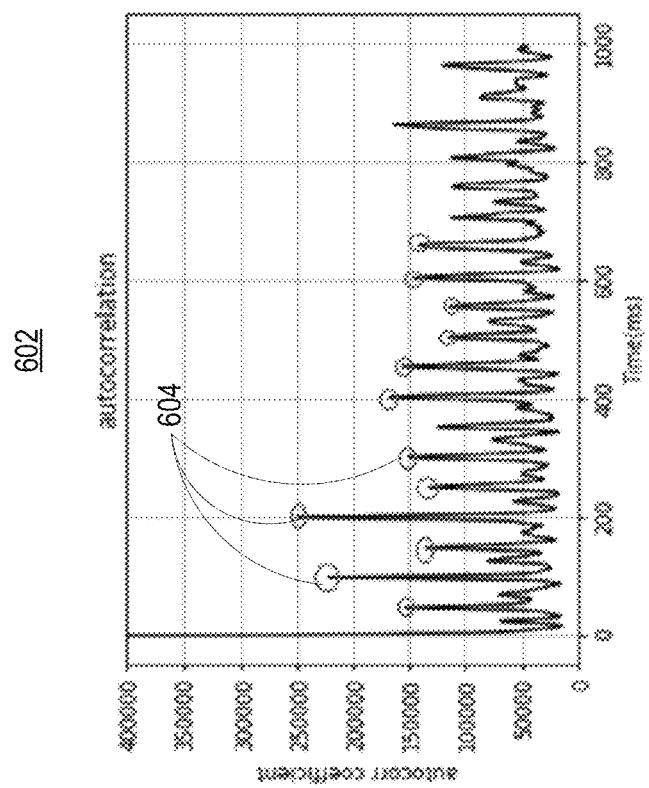
FIG. 6B is an example graphical representation of the raw data packet traffic of FIG. 6A after application of an auto-correlation function.
Figure 6A:
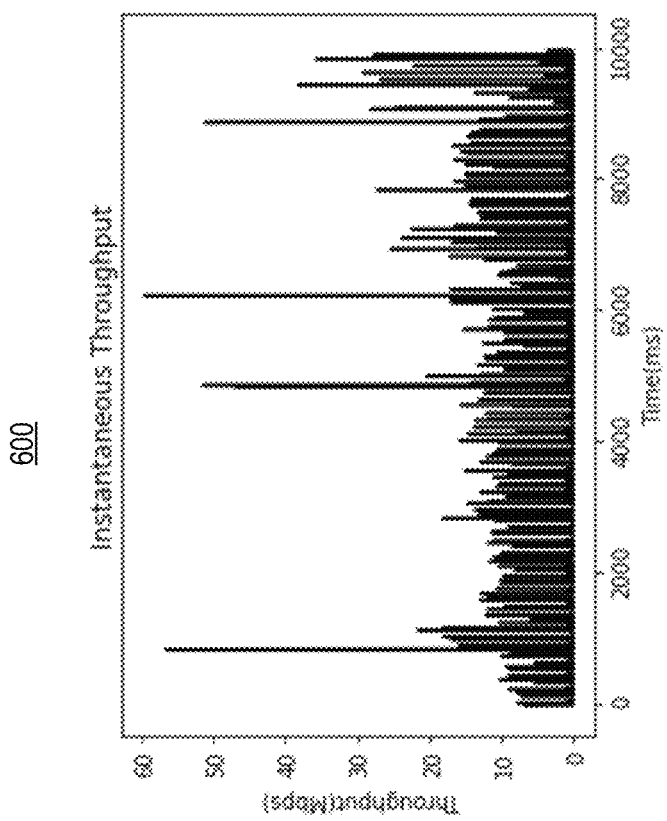
FIG. 6A is another example graphical representation of raw data packet traffic throughput.

FIG. 6A illustrates another example of raw data packet traffic reflected as a graph 600 where throughput is again shown as a function of time. Again, it can be appreciated that it is difficult to ascertain whether any regular intervals exist. Again, this can be due to, but not limited to, e.g., B-frame traffic, audio traffic, varying I-frame/P-frame size, frame jitters, etc. After processing the raw data with an autocorrelation function, the resulting data reflected in graph 602 of FIG. 6B shows peak autocorrelation coefficients at regular intervals of approximately 50 ms (some of which are labeled as 604 for ease of illustration). Such traffic periodicity can be indicative of 1080p motion video.

Figure 7B:
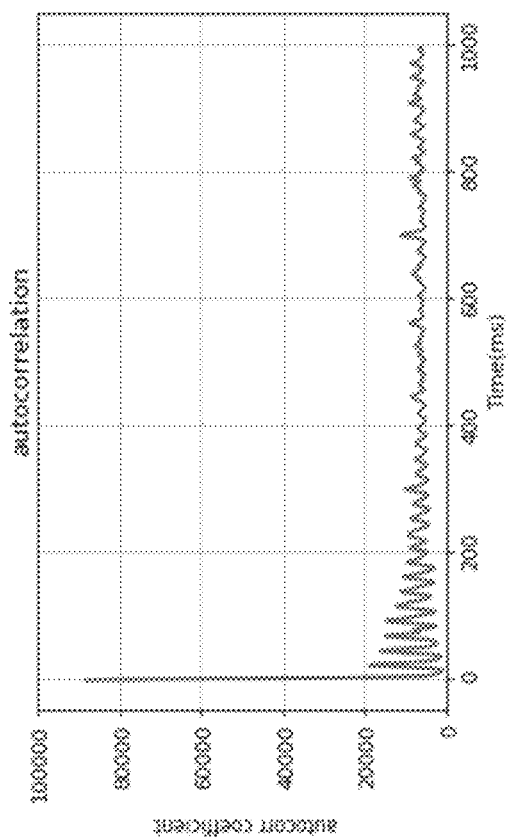
FIG. 7B is an example graphical representation of the raw data packet traffic of FIG. 7A after application of an auto-correlation function.
Figure 7A:
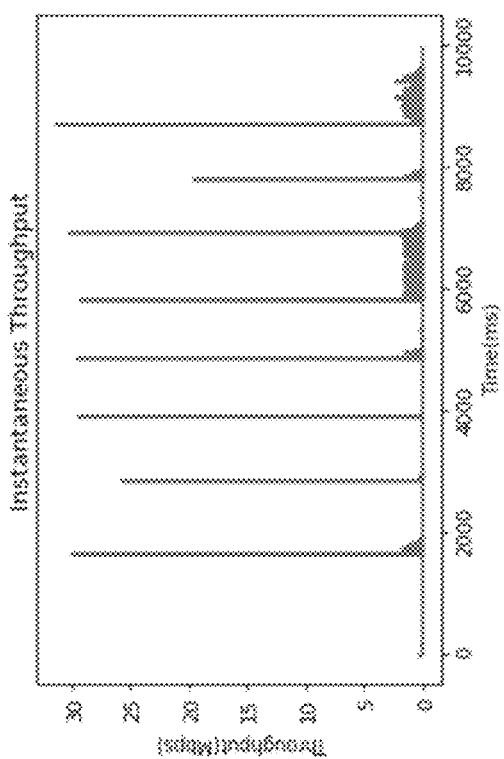
FIG. 7A is yet another example graphical representation of raw data packet traffic throughput.

FIG. 7A illustrates an example of raw data packet traffic corresponding to the transfer of data using an SSH File Transfer Protocol (SFTP). Here, the data may appear to have some periodicity, but after processing the raw data through an autocorrelation function, it can be appreciated that no consistent intervals exist. That is, and as illustrated in FIG. 7B, there is no actual discernable traffic periodicity, suggesting this data packet traffic is not encoded video from a hidden camera.

As noted above, certain non-traffic related features or qualities of data packets can be useful in determining whether or not a hidden camera is operating in a network. For example, operating system fingerprints and device movement can be determined, and used to lower false positive predictions (existence of a hidden camera). For example, operating system fingerprints associates with data packets can be determined by active or passive snooping of IP packets. Hidden cameras tend to have embedded systems, and typical operating systems such as Windows and MacOS are not used for such hidden cameras. Thus, upon determining a particular device operating on a network is using Windows or MacOS as its operating system can be assumed not to be a hidden camera.

Along those lines, movement of a device can be an indication that a particular device is not a hidden camera. As noted above, hidden cameras tend to be installed in such a way that they remain relatively stationary. This is unlike other typical wireless devices, such as laptop computers, tablet computers, smartphones, and the like, where users tend to move such devices fairly often, from room-to-room, in and out of a room, etc. Using Wi-Fi location-based services or other wireless location functionality known now or in the future, movement of a device can be detected. If a device is detected as being moved more than a determined threshold, e.g., more than some threshold distance, more often that some threshold number, etc., it may be assumed that the device is not a hidden camera.

It should be understood that two or more of the aforementioned features or characteristics of data packets/data packet traffic may complement each other, i.e., one may strengthen an assumption, e.g., if a particular data packet traffic periodicity is observed, the hidden camera machine learning model may assume that a hidden camera is present. Upon observing a particular packet size distribution, that observation may further solidify the assumption that a hidden camera is present.

It should be also be understood that the aforementioned features/characteristics may be identified in samples of data packet traffic observed in one or more networks. They can be used as training datasets to train a hidden camera detection machine learning model, e.g., through supervised machine learning techniques, where the characteristic traits of hidden camera data traffic (or other non-traffic related features) can be identified and labeled as such. After training, the hidden camera detection machine learning model may then analyze actual/real-time data packets/data packet traffic in an actual network, and predict or determine whether or not a hidden camera(s) is operating on the network. Again, the hidden camera detection machine learning model may be implemented on an access point of the network (or a separate network, e.g., as can be the case if an access point is being used as a sniffer to sniff data packets of another access point).

Figure 8A:
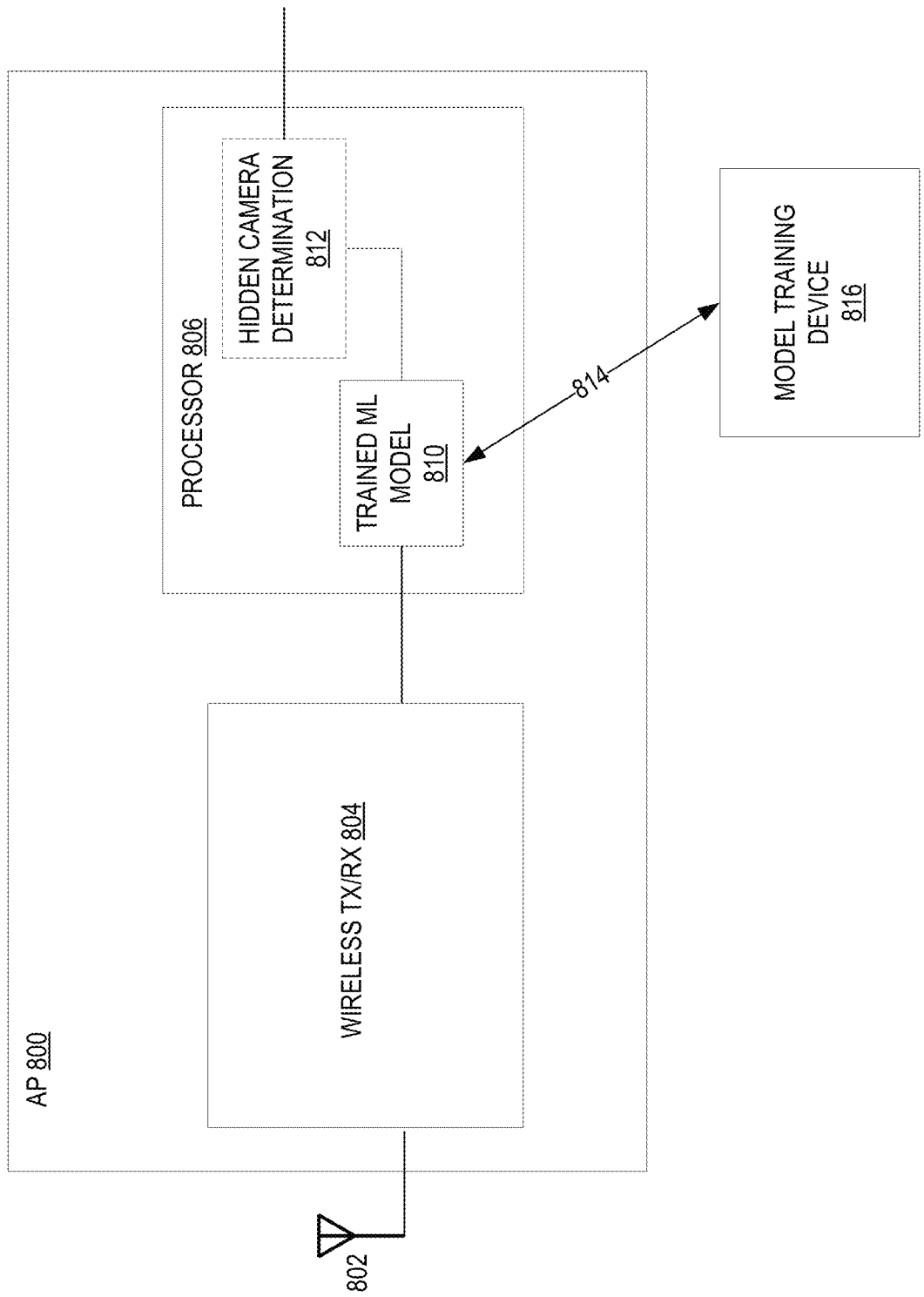
FIG. 8A illustrates an example access point configured to determine existence of a hidden camera in accordance with one embodiment.

FIG. 8A illustrates an example access point 800 in which a trained hidden camera machine learning model may be implemented to determine the existence of hidden cameras on a network. Access point 800 may be an embodiment of access point 110 (FIGS. 1A, 1B). Access point 800 may include an antenna 802, a wireless transceiver 804, and processor 806. Processor 806 includes a trained machine learning model 810 and a determination component 812. Access point 800 is communicatively coupled to a model training device 816 and receives hidden camera detection pattern information 814 at processor 806 from the model training device 816. It should be understood, that access point 800 may receive an updated trained machine learning model 810 from model training device 816.

In some embodiments, access point 800 is configured to transmit and receive wireless signals through antenna 802. When operating in a certain wireless frequency band, access point 800 transceiver signals on a certain channel within the wireless frequency band. In some frequency bands (e.g. 5 GHz), some channels may overlap with operating channels in other types of network.

When wireless transceiver 804 is configured to send and receive signals via antenna 802 on a certain channel of a certain frequency band, signal monitor 808 monitors the received signals (data packet traffic) from within the network in which access point 800 is operating (or from another network, as might be the case when operating in sniffer mode). Those signals may be forwarded to processor 806 in which trained machine learning model 810 is implemented. Trained machine learning model 810 may analyze the received signals (data packet traffic from the network) and determine whether or not a hidden camera is operative on the network.

As noted above, trained machine learning model 810 is created and trained by model training device 816. Model training device 816 includes training data that may include any or all of the aforementioned traffic-related features/characteristics as well as non-traffic related features and characteristics of data packets/data packet traffic. In some examples, machine learning model 810 may be a decision tree machine learning model, but any appropriate machine learning model known currently or in the future may be utilized in other examples. As discussed above, based on identified traffic and non-traffic related features associated with operating characteristics of hidden camera devices and other wireless devices that may be operative in a network can be used to train machine learning model 810 to determine the existence (or absence) of a hidden camera(s).

Once machine learning model 810 has been trained, model training device 816 transmits trained machine learning model 810 to access point 800. Access point 800 then uses trained machine learning model 810 to generate hidden camera determinations 812 based on the signals received at antenna 802.

Figure 8B:
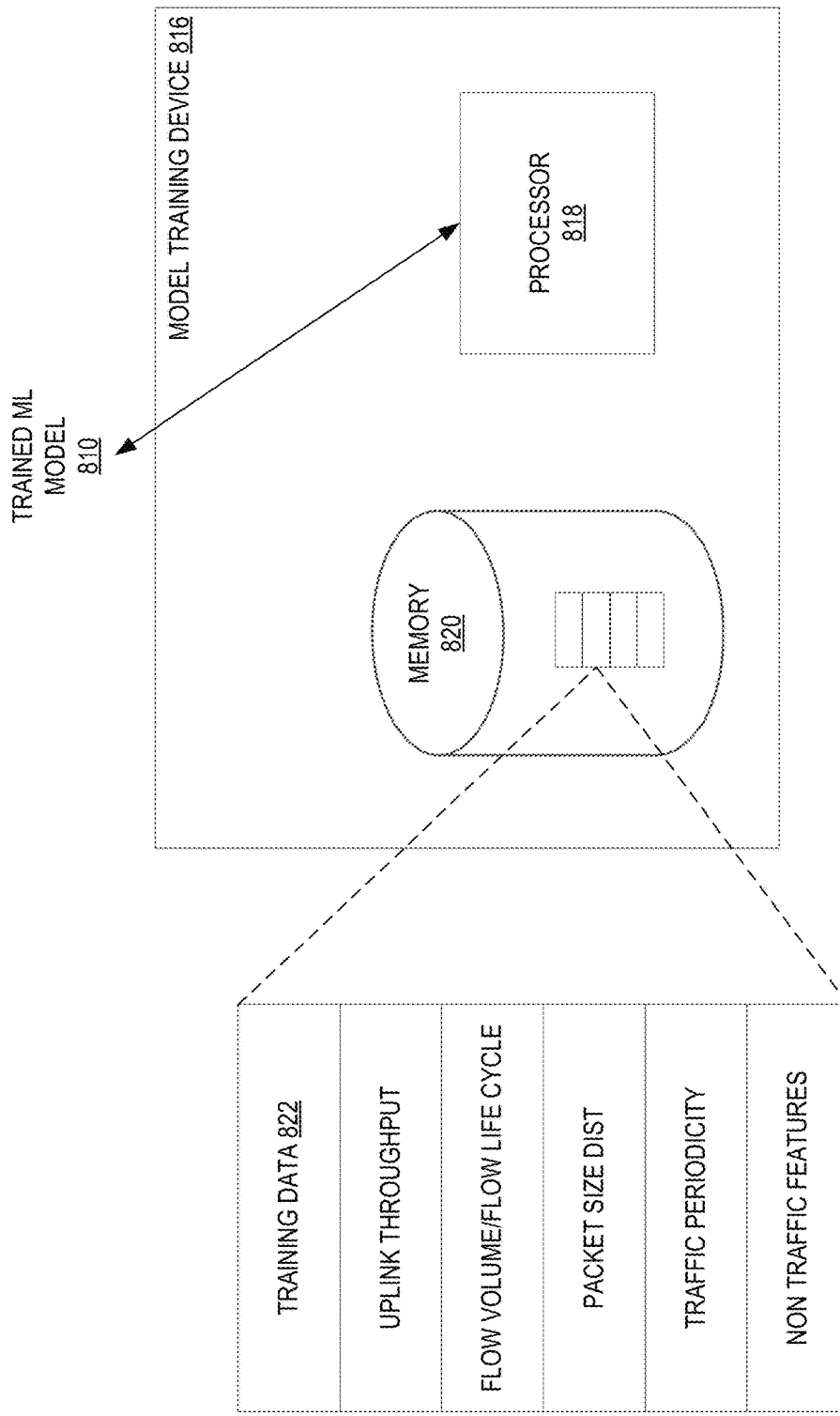
FIG. 8B illustrates the detail of a model training device for training a hidden camera detection machine learning model implemented with the access point of FIG. 8A.

FIG. 8B illustrates model training device 816 of FIG. 8A in greater detail. As illustrated in FIG. 8B, model training device 816 may comprise a processor 818 and a memory 820 in which training datasets, such as training data 822 may be received and stored for use in training machine learning model 810. As noted above, training data 822 can include, but is not necessarily limited to uplink throughput data, flow volume/flow life cycle data, packet size distribution data, traffic periodicity data, and non-traffic related features. Memory 820 may further include instructions for training machine learning model 810, and sending the trained machine learning model 810 to access point 800. In some embodiments, memory 820 may comprise instructions for operating access point 800 as a network sniffer, when attempting to monitor/analyze data packet traffic of another access point.

Figure 9:
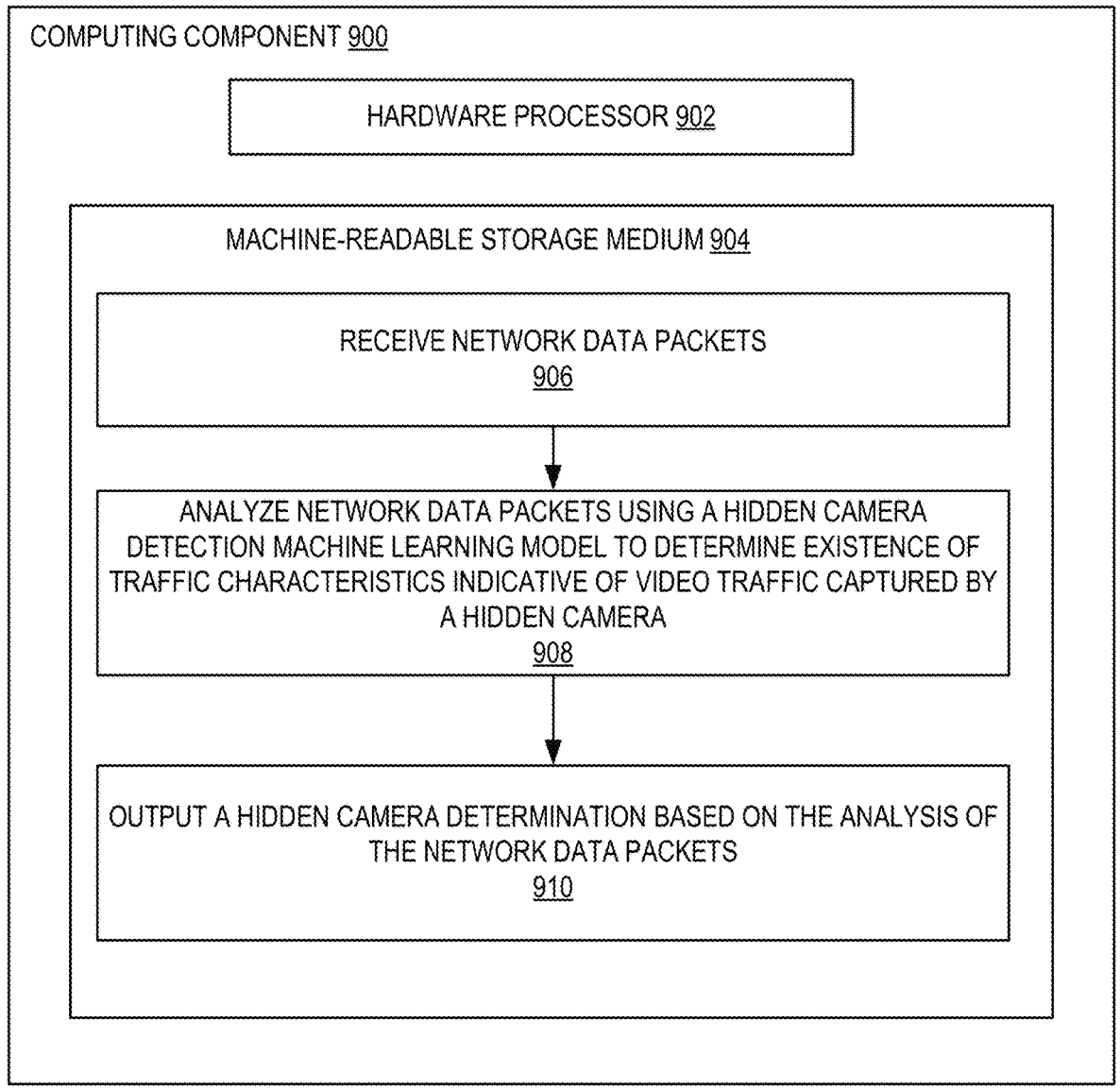
FIG. 9 is a block diagram of an example computing component for performing hidden camera detection in a network according to one embodiment.

FIG. 9 is a block diagram of an example computing component or device 900 for performing hidden camera detection in a network. In the example implementation of FIG. 9, computing component 900 includes a hardware processor 902, and machine-readable storage medium 904. In some embodiments, computing component 900 may be an embodiment of a processor. Computing component 900 may be an embodiment of access point 110 (FIGS. 1A, 1B, 8A) or processor of access point 110, e.g., processor 806 (FIG. 8A).

Hardware processor 902 may be one or more central processing units (CPUs), semiconductor-based microprocessors, and/or other hardware devices suitable for retrieval and execution of instructions stored in machine-readable storage medium, 904. Hardware processor 902 may fetch, decode, and execute instructions, such as instructions 906-912, to control processes or operations for computing parameter dependencies in accordance with one embodiment. As an alternative or in addition to retrieving and executing instructions, hardware processor 902 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 904, may be any electronic, magnetic, optical, or other physical storage device that contains or stores executable instructions. Thus, machine-readable storage medium 904 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 904 may be a non-transitory storage medium, where the term "non-transitory" does not encompass transitory propagating signals. As described in detail below, machine-readable storage medium 904 may be encoded with executable instructions, for example, instructions 906-910.

Hardware processor 902 may execute instruction 906 to receive network data packets, such as a stream of network data packets. As described above, data packets within a network may originate from any number of wireless devices, such as smartphones, laptop computers, tablet computers, video streaming devices, such as network-connected TVs, etc. Also present in a network may be a hidden camera(s). Such devices may communicate with another device, transmit data packets to another device, etc. Thus, the data packets may traverse one or more access points. In other embodiments, the data packets of another access point may be sniffed.

Hardware processor 902 may execute instruction 908 to analyze the network data packets using a hidden camera detection model to determine existence of traffic characteristics indicative of video traffic captured by a hidden camera. As described above, the hidden camera detection model may be trained using network traffic, and may be able to determine or make predictions regarding the existence of a hidden camera based on traffic related characteristics. As discussed above, such traffic related characteristics can include traffic periodicity corresponding to I-frame and P-frame traffic, packet size distribution amongst I/P-frames and video ACKs, uplink throughput, etc. In some embodiments, non-traffic related features of data packets, such as operating system fingerprints and the detection of movement may be used to further confirm the existence or absence of a hidden camera in the network over which the access point is receiving the network data packets.

Hardware processor 902 may execute instruction 910 to output a hidden camera determination based on the analysis of the network data packets. Based on whether features indicative of a hidden camera transmitting video appear in the network data packets, the access point may generate a notification, report, or other indication of the presence or absence of a hidden camera.

Figure 10:
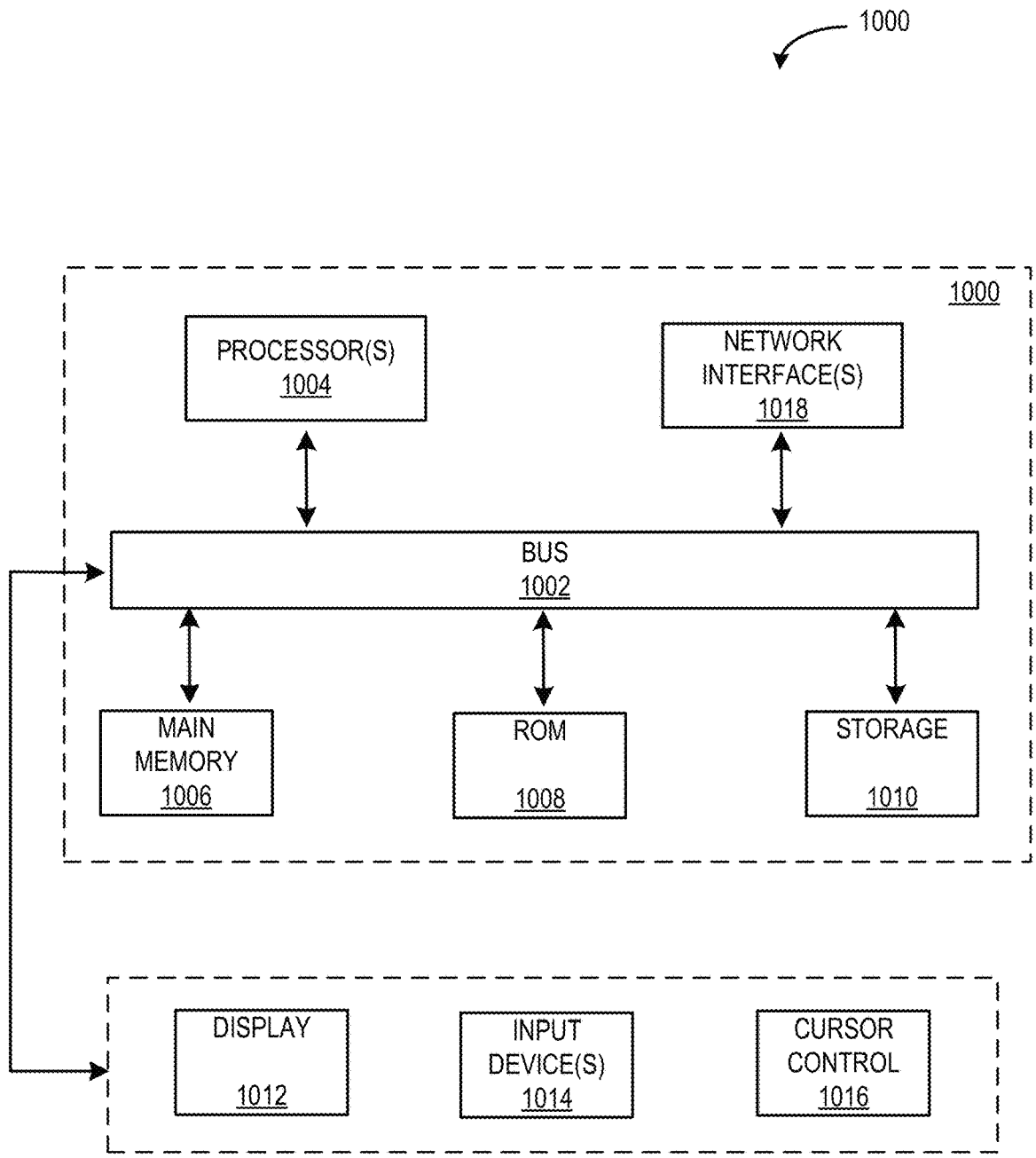
FIG. 10 illustrates an example computing component in which various embodiments described herein may be implemented.

FIG. 10 depicts a block diagram of an example computer system 1000 in which various of the embodiments described herein may be implemented. The computer system 1000 includes a bus 1002 or other communication mechanism for communicating information, one or more hardware processors 1004 coupled with bus 1002 for processing information. Hardware processor(s) 1004 may be, for example, one or more general purpose microprocessors.

The computer system 1000 also includes memory units, such as a main memory 1006, such as a random access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

The computer system 1000 further includes a read only memory (ROM) 1008 or other static storage device coupled to bus 1002 for storing static information and instructions for processor 1004. A storage device 1010, such as a magnetic disk, optical disk, or USB thumb drive (Flash drive), etc., is provided and coupled to bus 1002 for storing information and instructions. Also coupled to bus 1002 are a display 1012 for displaying various information, data, media, etc., input device 1014 for allowing a user of computer system 1000 to control, manipulate, and/or interact with computer system 1000. One manner of interaction may be through a cursor control 1016, such as a computer mouse or similar control/navigation mechanism.

In general, the word "engine," "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor(s) 1004 executing one or more sequences of one or more instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1010. Volatile media includes dynamic memory, such as main memory 1006. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1002. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. An access point, comprising:
   a wireless transceiver;
   a processor; and
   a memory unit storing computer code that when executed causes the processor to:
   monitor data packets received by the wireless transceiver;
   extract from the monitored data packets, first information regarding characteristics of the monitored data packets including at least one of throughput, traffic stability, flow, packet size distribution, and traffic periodicity;
   extract from the monitored data packets, second information regarding non-traffic-related characteristics of the monitored data packets including a lack of movement of one or more source devices of the monitored data packets; and
   based on the first information and the second information, determine that the one or more devices sending at least a portion of the monitored data packets comprises a wireless surveillance camera.

2. The access point of claim 1, wherein the second information comprises a determination that an operating system fingerprint reflects a non-personal computing operating system that is suggestive that the one or more devices comprises the wireless surveillance camera.

3. The access point of claim 1, wherein the memory unit stores computer code that when executed further causes the processor to apply an autocorrelation function to the information regarding the traffic periodicity.

4. The access point of claim 3, wherein the memory unit stores computer code that when executed further causes the processor to apply the autocorrelation function at burst intervals.

5. The access point of claim 4, wherein a second determination that the traffic periodicity subsequent to application of the autocorrelation function reflects substantially regularly periodic throughput peaks corresponding to at least one of I-frame and P-frame traffic periodicity is suggestive that one or more wireless devices comprises the wireless surveillance camera.

6. The access point of claim 1, wherein a determination that the throughput reflects uplink throughput distribution commensurate with a particular bandwidth is suggestive that the one or more devices comprises the wireless surveillance camera transmitting encoded video having a particular resolution.

7. The access point of claim 1, wherein a determination that the packet size distribution reflects a first data packet followed by a relatively smaller data packet corresponding to an I-frame fragment and a video acknowledgement is suggestive that one or more wireless devices comprises the wireless surveillance camera.

8. The access point of claim 1, wherein the memory unit comprises computer code that when executed further causes the processor to operate in a network sniffer mode to extract from data packets associated with another access point or data packets exchanged between the access point and the another access point, information regarding characteristics of the data packets associated with the another access point including at least one of throughput, traffic stability, flow, packet size distribution, and traffic periodicity.

9. The access point of claim 8, wherein the memory unit comprises computer code that when executed further causes the processor to, based on the information regarding the characteristics of the data packets associated with the another access point, determine whether the one or more devices communicating with the another access point comprises the wireless surveillance camera.

10. A method comprising:
monitor data packets received by a wireless transceiver;
extract from the monitored data packets, first information regarding characteristics of the monitored data packets including at least one of throughput, traffic stability, flow, packet size distribution, and traffic periodicity;
extract from the monitored data packets, second information regarding non-traffic-related characteristics of the monitored data packets including a lack of movement of one or more source devices of the monitored data packets; and
based on the first information and the second information, determine that the-one or more devices sending at least a portion of the monitored data packets comprises a wireless surveillance camera.

11. The method of claim 10, wherein the second information comprises a determination that an operating system fingerprint reflects a non-personal computing operating system that is suggestive that the one or more devices comprises the wireless surveillance camera.

12. The method of claim 10, further comprising:
applying an autocorrelation function to the information regarding the traffic periodicity.

13. The method of claim 12, further comprising:
applying the autocorrelation function at burst intervals.

14. The method of claim 13, wherein a second determination that the traffic periodicity subsequent to application of the autocorrelation function reflects substantially regularly periodic throughput peaks corresponding to at least one of I-frame and P-frame traffic periodicity is suggestive that one or more wireless devices comprises the wireless surveillance camera.

15. The method of claim 10, wherein a determination that the throughput reflects uplink throughput distribution commensurate with a particular bandwidth is suggestive that the one or more devices comprises the wireless surveillance camera transmitting encoded video having a particular resolution.

16. The method of claim 10, wherein a determination that the packet size distribution reflects a first data packet followed by a relatively smaller data packet corresponding to an I-frame fragment and a video acknowledgement is suggestive that one or more wireless devices comprises the wireless surveillance camera.

17. The method of claim 10, further comprising:
operating in a network sniffer mode to extract from data packets associated with another access point or data packets exchanged between the access point and the another access point, information regarding characteristics of the data packets associated with the another access point including at least one of throughput, traffic stability, flow, packet size distribution, and traffic periodicity.

18. The method of claim 17, further comprising:
based on the information regarding the characteristics of the data packets associated with the another access point, determining whether the one or more devices communicating with the another access point comprises the wireless surveillance camera.

19. A non-transitory computer-readable storage medium storing a plurality of instructions executable by one or more processors, the plurality of instructions when executed by the one or more processors cause the one or more processors to:
monitor data packets received by a wireless transceiver;
extract from the monitored data packets, first information regarding characteristics of the monitored data packets including at least one of throughput, traffic stability, flow, packet size distribution, and traffic periodicity;
extract from the monitored data packets, second information regarding non-traffic-related characteristics of the monitored data packets including a lack of movement of one or more source devices of the monitored data packets; and
based on the first information and the second information, determine that the-one or more devices sending at least a portion of the monitored data packets comprises a wireless surveillance camera.

20. The non-transitory computer-readable storage medium of claim 19, wherein the second information comprises a determination that an operating system fingerprint reflects a non-personal computing operating system that is suggestive that the one or more devices comprises the wireless surveillance camera.

* * * * *